Aug. 11, 1953  N. B. HENRY  2,648,100
FRICTION LET-OFF FOR PICKER CALENDERS
Filed Nov. 24, 1950
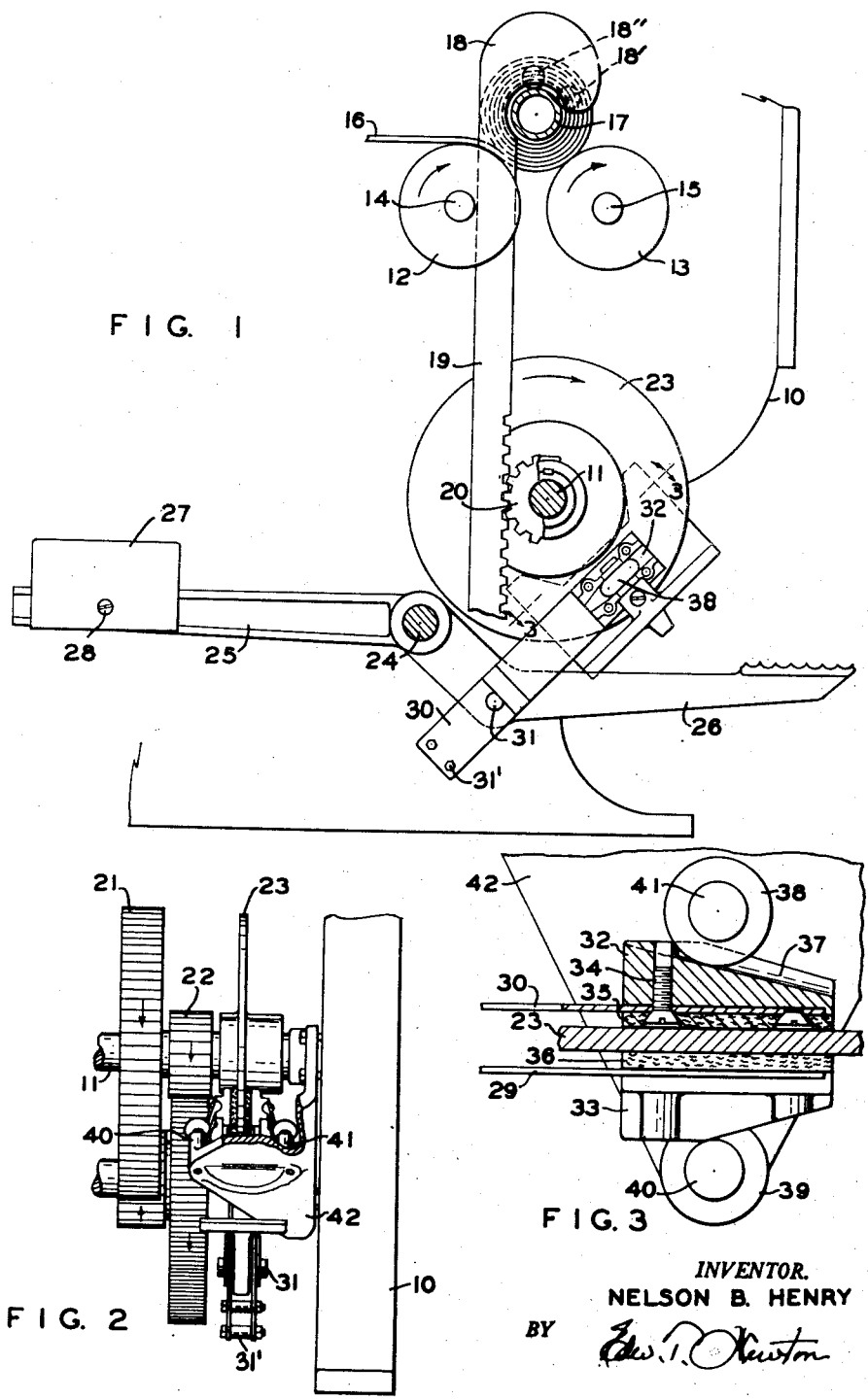
INVENTOR.
NELSON B. HENRY
BY
ATTORNEY Patented Aug. 11, 1953

2,648,100

UNITED STATES PATENT OFFICE 2,648,100

FRICTION LETOFF FOR PICKER CALENDERS

Nelson B. Henry, Atlanta, Ga., assignor to Aldrich Machine Works, Greenwood, S. C., a partnership Application November 24, 1950, Serial No. 197,330

10 Claims. (Cl. 19—162)

My invention relates to an automatic tensioning control generally, but more in particular to what is known in the textile industry as an improved friction let-off for picker calenders.

The most commonly known and used tensioning device for the loggerhead of picker calenders consists of a brake drum rotated by a system of gears driven by a rack and pinion, the rack being extended and connected to the end of the loggerhead roller on which the lap is being wound so that as the diameter of the roll of lap increases the loggerhead is made to rotate the pinion. The pinion, in turn, rotates the brake drum through the gear train. To apply braking action to the rotating brake drum, the former construction includes a pivoted brake shoe engageable with the drum and having an adjustable counter-balance adapted to apply selected pressure to the drum by the shoe. While such a system has been used for a considerable length of time as a tensioning device, it is readily apparent to those familiar with the art that the system is greatly in need of improvement. Oil and grease which necessarily are found around machinery often fall upon the brake shoe, thus reducing the coefficient of friction and producing a lap wound too loosely. If the counter-balance is adjusted for more weight, the device is again out of adjustment as soon as the oil is wiped off or burned away by the action of the brake shoe.

The former design further places the segmental brake shoe immediately beneath the drum so that when the shoe is released manually by a treadle, the frictional surface of the shoe is exposed upwardly to any lint, dust or other bodies which might fall thereon without notice to an operator, and which change the coefficient of friction as soon as it is placed in service again.

It is an object of the present invention to provide a friction let-off for picker calenders which automatically governs the amount of tension applied to lap being wound upon the loggerhead.

Another object of the invention is to provide a disc-shaped brake drum for such a device adapted for rotation between a pair of brake shoes having inclined, outer faces engageable with stationary rollers, the shoes being counterbalanced so that the counterbalance weight forces the inclined planes of the shoes against their respective rollers to stop the drum rotation, and the shoes are relieved from such wedged position when the tension tending to rotate the disc overcomes the weight of the counterbalance.

A further object of the invention is to provide an automatic tensioning device wherein the brake disc is stopped and released in such short intervals that a substantially smooth, upward movement is effected by the loggerhead, thus producing a more uniform wind of the lap upon its roller.

A further object of the invention is to provide such a braking system wherein the brake shoes are mounted in a horizontal plane and disposed to apply braking action to the sides of the brake disc whereby foreign bodies are allowed to fall between the actual braking surfaces instead of being held therebetween.

Another object of the invention is to effect a squeezing or wedging action between the brake shoes and disc to eliminate slippage found in the former devices.

Another object of the invention is to provide a pair of brake shoes mounted upon members constituting a bifurcated spring to provide instant release of the shoes from their wedged, braking position.

A still further object of the invention is to provide a friction let-off for picker calenders which is easy to manufacture and maintain and which is readily adaptable to machines constructed according to prior methods.

Further objects and advantages of the invention will become apparent in the course of the following detailed description when viewed together with the accompanying drawing in which:

Fig. 1 is a side elevational view of an embodiment of my invention in a friction let-off for picker calenders.

Fig. 2 is an end view of a portion of the device illustrated in Fig. 1.

Fig. 3 is a broken cross-sectional view taken along line 3—3 of Fig. 1.

In the drawing, numeral 10 designates generally one of the side frames of a picker calender. It is understood that the opposite side frame is similar in construction; the two spaced side frames are provided with suitable bearings adapted to receive a prior art shaft 11. As in the prior art construction, the picker calender is provided with two upper guide rolls 12, 13 mounted upon shafts 14, 15, respectively, the ends of which are also journaled in the side frames. These guide rolls 12 and 13 serve as a notch or cradle for not only positioning the roll of lap 16 as it is wound upon its roller 17 but also to press tangentially against the rolled lap so the same may be wound with some degree of uniformity.

Also constructed according to prior art is a loggerhead, designated generally by the numeral 18 and provided with rollers 18' and 18" arranged for engagement with the end of the roller 17 to apply weight in the manner as will be more clearly pointed out later in the specification.

The lower end of the loggerhead 18 is provided with a rack 19 enmeshed with a pinion 20 which is fixed to the shaft 11. Operatively associated with the turning of the shaft by the rack and pinion is a gear train 21, the final driven gear 22 of which is made to rotate freely upon the shaft 11 yet this gear is rigidly affixed to a braking disc 23 also made to rotate freely upon the shaft 11. The gears of the train 21 are of such diameters that only a slight movement imparted by the rack and pinion imparts considerable rotary motion to the brake disc 23.

Mounted beneath the mechanism just described is the usual jack shaft 24 fixed in the side frames of the calender and arranged to support a counterbalance arm 25 and a foot operated release lever 26 which is integrally connected to the counterbalance arm. Both the arm 25 and the lever 26 are rotatable on shaft 24 with the arm protruding rearwardly under the machine while the release lever 26 or treadle projects out from under the machine where it may be actuated by the foot of an operator.

The arm 25 supports a weight 27 which is movable along the length of the arm and is locked into such adjusted positions by means of set screw 28.

The foot lever 26 is of prior art construction but is provided with two metal straps 29 and 30, positioned one on each side of the lever 26 and held to the same by means of a bolt 31. The two straps are set at an angle as shown in Fig. 1 and extend upwardly in the form of a bifurcated spring so as to straddle the brake disc 23; the two straps, or spring leaves, being joined together at their lower ends by two through bolts 31', and given a permanent set to bias them away from the brake disc. At the outer ends of the straps 29 and 30, I have provided metal brake shoes 32 and 33 shown more clearly in Figs. 2 and 3. Each of the shoes is positioned on the outer face of its supporting strap and held in such position by means of screws 34 positioned from the inside of the strap and screwed into the shoe. It will be noted that these mounting screws also position strips of brake lining 35 and 36 on the inside face of their respective shoes 32 and 33. Each shoe is further provided with an inclined, semicircular trough 37 engageable with stationary rollers 38 and 39 for wedging the linings 35 and 36 against the brake disc 23.

Each of the rollers 38 and 39 is rotatably mounted upon standards 40 and 41 supported by a bracket 42 bolted or otherwise affixed to one of the side frames of the picker calender. The design of the bracket 42 is such that the standards 40 and 41 with their respective rollers are spaced equi-distantly from the vertical center line of the brake disc 23. While the disc 23 is permitted to move laterally along the shaft 11 to some extent, it can be seen that the rollers 38 and 39 center the disc between them when the actual braking is applied. Thus the pressure of the linings is always equalized against the disc to insure perfect control to the disc rotation.

When in use, the device operates similar to the mechanism described in the prior art with the rollers 18' and 18" of the loggerhead 18 in position over an end of the lap roller 17. As the two rolls 12 and 13 are rotated, the roll of lap is cradled between them, gradually increasing in diameter. It is obvious that, to form a roll of lap properly, a given tension must be applied to the loggerhead, which, by its own weight and by use of the braking system herein employed, presses the complete roll of lap against the two rolls 12 and 13. If the proper weight is applied, the fibers of the lap 16 are held to a given tension and the completed roll is properly formed.

As mentioned in the description of the construction of the device, when the diameter of the roll of lap increases, an upward movement is imparted to the loggerhead 18, causing the rack 19 to rotate the pinion 20 and consequently impart a rotary movement to the brake disc 23 in the direction of the arrow shown in Fig. 1 when the tension on the lap 16 is sufficient to overcome the force of the weight 27. Movement of the brake disc 23, however, removes the brake shoes from their wedged position and allows the spring straps 29, 30 to relieve the inward pressure of the linings against the sides of the disc 23; but this turning of the brake disc permits the loggerhead to rise and relieve the tension on the lap, and the counterweight 27 immediately takes over as soon as the force tending to rotate the brake disc becomes less than the force of the counterweight. When the force of the counterweight predominates, it moves the inclined outer faces of the brake shoes into wedging position beneath the fixed rollers and the wedging action thus provided immediately grips the disc between the shoes and will hold it fast until the force tending to rotate the disc overcomes the force of the counterweight. It will thus be seen that the tension in the lap does not operate against the coefficient of friction in the brake shoes, but only against the force of the counterweight itself, and the counterweight can be readily adjusted to regulate this force. The disc 23 is permitted to rotate only in short, periodic intervals, with an actual stopping period so slight it is hardly noticeable to the eye, yet providing complete and uniform movement to the rising loggerhead 18.

As soon as the lap roller 17 is full and the roll is completed, the operator removes the same and inserts another one for filling. By pressing the foot lever 26, the linings 35 and 36 are brought completely away from the disc 23 permitting the weight of the loggerhead 18 to reverse the disc and gear train 21 to a new starting position with the loggerhead rollers 18' and 18" resting on the end of the newly inserted lap roller.

From the drawings and the above description of operation, it will be readily apparent that the present invention is a considerable improvement over any of the devices heretofore known or used. The component parts are simple in construction and may be made to operate in conjunction with much of the construction presently appearing on picker calender machines. Each part is easily reached for repair or replacement and while the counterbalancing weight is necessary for operation, the constant adjustment thereof as found necessary in former machines has been completely eliminated.

While the device herein is shown and described in a preferred embodiment as an improved friction let-off for a picker calender, it is to be understood that this has been by way of example only, and that the device may assume various forms in its construction or be used as a tensioning means in other machinery without departing from the scope of the invention as defined by the following claims.

I claim:

1. Apparatus of the class described comprising a rotatably mounted brake disc operatively connected to the loggerhead of a picker calender, a pivotally mounted lever arm, carrier means mounted upon said arm, brake shoes carried by said carrier means and having inner faces arranged for engagement with opposite sides of said disc, said shoes having inclined outer faces, spaced pressure means fixedly mounted adjacent said shoes, said carrier means being biased to press said shoes outwardly from said disc to engage said pressure means with the inclined faces of said shoes, and adjustable means arranged to urge said brake shoes between said pressure means to wedge the brake shoes against the sides of the brake disc, the operative direction of rotation of said disc by the loggerhead being such as to release the disc from being wedged between the brake shoes.

2. Apparatus of the class described comprising a brake disc operatively connected to the loggerhead of a picker calender, a shaft supporting said disc, said disc being slidably and rotatably mounted upon said shaft, a pivotally mounted lever arm, carrier means mounted upon said arm, brake shoes carried by said carrier means and having inner faces arranged for engagement with opposite sides of said disc, said shoes having inclined outer faces, spaced pressure means fixedly mounted adjacent said shoes, said carrier means being biased to press said shoes outwardly from said disc to engage said pressure means with the inclined faces of said shoes, and a counterweight adjustably mounted on said lever arm so as to urge said brake shoes between said pressure means to wedge the brake shoes against the sides of the brake disc, the operative direction of rotation of said disc by the loggerhead being such as to release the disc from being wedged between the brake shoes.

3. Apparatus of the class described comprising a brake disc operatively connected to the loggerhead of a picker calender, a horizontal shaft supporting said disc, said disc being slidably and rotatably mounted upon said shaft, a pivotally mounted lever arm, carrier means mounted upon said arm, brake shoes carried by said carrier means and having inner faces arranged for engagement with opposite sides of said disc, said shoes having inclined outer faces provided with grooves, spaced pressure means fixedly mounted adjacent said shoes, said carrier means being biased to press said shoes outwardly from said disc to engage said pressure means in the grooves in the inclined faces of said shoes, and a counterweight adjustably mounted on said lever arm so as to urge said brake shoes between said pressure means to wedge the brake shoes against the sides of the brake disc, the operative direction of rotation of said disc by the loggerhead being such as to release the disc from being wedged between the brake shoes.

4. Apparatus of the class described comprising a brake disc operatively connected to the loggerhead of a picker calender, a horizontal shaft supporting said disc, said disc being slidably and rotatably mounted upon said shaft, a pivotally mounted lever arm, spring means mounted upon said arm, brake shoes carried by said spring means and having inner faces arranged for engagement with opposite sides of said disc, said shoes having inclined outer faces provided with grooves, spaced pressure means fixedly mounted adjacent said shoes, said spring means being biased to press said shoes outwardly from said disc to engage said pressure means in the grooves in the inclined faces of said shoes, and a counterweight adjustably mounted on said lever arm so as to urge said brake shoes between said pressure means to wedge the brake shoes against the sides of the brake disc, the operative direction of rotation of said disc by the loggerhead being such as to release the disc from being wedged between the brake shoes.

5. Apparatus of the class described comprising a brake disc operatively connected to the loggerhead of a picker calender, a horizontal shaft supporting said disc, said disc being slidably and rotatably mounted upon said shaft, a pivotally mounted lever arm, bifurcated spring means mounted upon said arm, brake shoes carried by said spring means and having inner faces arranged for engagement with opposite sides of said disc, said shoes having inclined outer faces provided with grooves, spaced pressure means fixedly adjacent said shoes, said spring means being biased to press said shoes outwardly from said disc to engage said pressure means in the grooves in the inclined faces of said shoes, and a counterweight adjustably mounted on said lever arm so as to urge said brake shoes between said pressure means to wedge the brake shoes against the sides of the brake disc, the operative direction of rotation of said disc by the loggerhead being such as to release the disc from being wedged between the brake shoes.

6. Apparatus of the class described comprising a brake disc, a pivotally mounted lever arm, carrier means mounted upon said arm, a brake shoe carried by said carrier means and having an inner face arranged for engagement with a side of said disc, said shoe having an inclined outer face, pressure means fixedly mounted adjacent said shoe, said carrier means being biased to press said shoe outwardly from said disc to engage said pressure means with the inclined face of said shoe, and means to urge said brake shoe between said pressure means and said disc to wedge the brake shoe against a side of the brake disc, the operative direction of rotation of said disc being such as to release the disc from being wedged.

7. Apparatus of the class described comprising a brake disc, a pivotally mounted lever arm, carrier means mounted upon said arm, brake shoes carried by said carrier means and having inner faces arranged for engagement with opposite sides of said disc, said shoes having inclined outer faces, spaced pressure means fixedly mounted adjacent the inclined faces of said shoes, and means to urge said brake shoes between said pressure means to wedge the brake shoes against the sides of the brake disc, the operative direction of rotation of said disc being such as to release the disc from being wedged between the brake shoes.

8. Apparatus of the class described comprising a brake disc, a shaft supporting said disc, said disc being slidably and rotatably mounted upon said shaft, a pivotally mounted lever arm, carrier means mounted upon said arm, brake shoes carried by said carrier means and having inner faces arranged for engagement with opposite sides of said disc, said shoes having inclined outer faces, spaced pressure means fixedly mounted adjacent the inclined faces of said shoes, and means to urge said brake shoes between said pressure means to wedge the brake shoes against the sides of the brake disc, the operative direction of rotation of said disc being such as to release the disc from being wedged between the brake shoes.

9. Apparatus of the class described comprising a brake disc, a horizontal shaft supporting said disc, said disc being slidably and rotatably mounted upon said shaft, a pivotally mounted lever arm, carrier means mounted upon said arm, brake shoes carried by said carrier means and having inner faces arranged for engagement with opposite sides of said disc, said shoes having inclined outer faces, spaced pressure means fixedly mounted adjacent said shoes, said carrier means being biased to press said shoes outwardly from said disc to engage said pressure means with the inclined faces of said shoes, and adjustable means arranged to urge said brake shoes between said pressure means to wedge the brake shoes against the sides of the brake disc, the operative direction of rotation of said disc being such as to release the disc from being wedged between the brake shoes.

10. Apparatus of the class described comprising a brake disc, a horizontal shaft supporting said disc, said disc being slidably and rotatably mounted upon said shaft, a pivotally mounted lever arm, carrier means mounted upon said arm, brake shoes carried by said carrier means and having inner faces arranged for engagement with opposite sides of said disc, said shoes having inclined outer faces provided with grooves, spaced pressure means fixedly mounted adjacent said shoes, said carrier means being biased to press said shoes outwardly from said disc to engage said pressure means in the grooves in the inclined faces of said shoes, and a counterweight mounted on said lever arm so as to urge said brake shoes between said pressure means to wedge the brake shoes against the sides of the brake disc, the operative direction of rotation of said disc being such as to release the disc from being wedged between the brake shoes.

NELSON B. HENRY.

References Cited in the file of this patent

UNITED STATES PATENTS

| Number | Name | Date |
|---|---|---|
| 75,169 | Kitson | Mar. 3, 1868 |
| 1,618,716 | Langevin | Feb. 22, 1927 |